(12) United States Patent
Takahashi et al.

(10) Patent No.: US 10,491,780 B2
(45) Date of Patent: Nov. 26, 2019

(54) CORRECTION OF IMAGE CAPTURED BY CAMERA OF PORTABLE TERMINAL WITH IMAGE READING DEVICE OR IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventors: Masaki Takahashi, Yokohama Kanagawa (JP); Naomi Nakane, Yokohama Kanagawa (JP); Hiromasa Tanaka, Sunto Shizuoka (JP); Akihiro Moro, Sunto Shizuoka (JP); Sunao Tabata, Sunto Shizuoka (JP); Takahiro Fuchigami, Yokosuka Kanagawa (JP); Nobuaki Takahashi, Sunto Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/886,030

(22) Filed: Feb. 1, 2018

(65) Prior Publication Data
US 2019/0238715 A1 Aug. 1, 2019

(51) Int. Cl.
*H04N 1/387* (2006.01)
*H04N 1/00* (2006.01)
*G06T 5/00* (2006.01)

(52) U.S. Cl.
CPC ............ *H04N 1/387* (2013.01); *G06T 5/006* (2013.01); *H04N 1/0044* (2013.01); *H04N 1/00251* (2013.01); *H04N 1/00315* (2013.01); *H04N 1/00541* (2013.01); *H04N 1/00559* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2003/0133730 A1* | 7/2003 | Conard-White | G03G 15/605 399/380 |
| 2013/0321830 A1* | 12/2013 | Jimenez | H04N 1/00535 358/1.13 |
| 2014/0028170 A1* | 1/2014 | Ito | G03G 21/16 312/327 |
| 2014/0118764 A1* | 5/2014 | Maghakian | B41J 3/44 358/1.13 |

FOREIGN PATENT DOCUMENTS

| | | |
|---|---|---|
| JP | 2015142310 A | 8/2015 |
| JP | 2016032145 A | 3/2016 |

* cited by examiner

*Primary Examiner* — Lennin R Rodriguezgonzalez
(74) *Attorney, Agent, or Firm* — Kim & Stewart LLP

(57) ABSTRACT

An image reading device includes a document placing table, and a cover. The cover is rotatably attached to the document placing table, and includes a receptacle for a portable terminal with a camera, the receptacle being configured to hold the portable terminal so that the camera faces the document placing table.

16 Claims, 13 Drawing Sheets

CORRECTION OF IMAGE CAPTURED BY CAMERA OF PORTABLE TERMINAL WITH IMAGE READING DEVICE OR IMAGE FORMING APPARATUS

FIELD

Embodiments described herein relate generally to an image reading device and an image forming apparatus.

BACKGROUND

In the related art, an image reading device called a multi-function peripheral or machine is known, which includes an original document platen cover and an original document reading unit reading an original document placed on an original document placing surface. A lamp for lighting an original document, provided inside the device, irradiates the original document placed on a transparent original document placing surface made of glass with light, and the original document reading unit images an image of an original document on a light receiving surface of a CCD sensor using a reduction optical system from a rear side of the original document placing surface. The original document platen cover holds in place the original document such that the original document placed on the original document placing surface is not moved. In addition, since reflection light on a region other than an original document surface is not imaged by a CCD light receiving sensor, the original document reading unit recognizes the region other than the original document surface as a black color. Therefore, when reading the image of the original document, the original document platen cover is used to cover the original document placing surface in order to prevent the original document reading unit from recognizing the region other than the original document surface as a black color, and reflects light applied to the region other than the original document surface.

Nowadays, a portable terminal with camera such as a smart phone is many persons so that most people have their own portable terminal. In addition, a resolution of a camera of the portable terminal is also improved, and an image of object imaged by the portable terminal with camera can be reproduced as a very clear image.

However, when the camera of the portable terminal images an original document or an object placed on an original document placing surface, a user holds the portable terminal by hand, and images the object. Therefore, hand shaking may be generated at the time of imaging. In addition, it is not easy to perform imaging when the camera is distant from the object. Therefore, even if the resolution of the camera of the portable terminal is improved, hand shaking may occur, or it is not easy to capture the entire range of the object.

DETAILED DESCRIPTION

An image reading device of an embodiment includes a document placing table, and a cover. The cover is rotatably attached to the document placing table and includes a receptacle for a portable terminal with a camera, the receptacle being configured to hold the portable terminal so that the camera faces the document placing table.

First Embodiment

Figure 1:
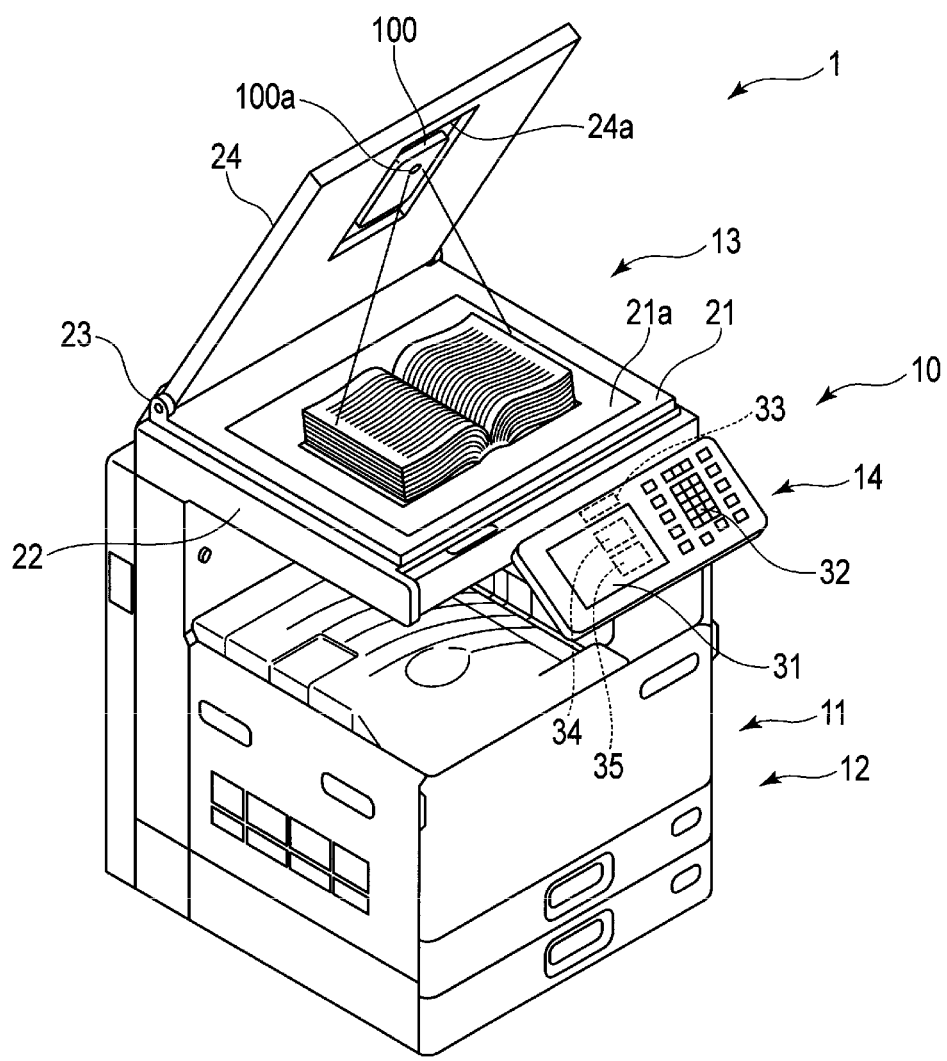
FIG. 1 is a perspective view illustrating a configuration of an image forming apparatus according to a first embodiment.

Hereinafter, an image forming apparatus 1 according to a first embodiment will be described with reference to FIG. 1. As illustrated in FIG. 1, the image forming apparatus 1 includes an image forming unit main body 11 configured to output image information as an output image, a paper supplying device 12 configured to supply paper to be used for image forming to the image forming unit main body 11, an image reading device 13 configured to read image information, and a control operating device 14. The image forming apparatus 1 includes a housing 10 which accommodates the image forming unit main body 11, the paper supplying device 12 and a part of the image reading device 13. The housing 10 includes a frame, an external panel, or the like.

The image forming unit main body 11 prints and outputs an image on paper of an arbitrary size as an output image. The image forming unit main body 11 includes, for example, a plurality of photoconductive drums, an exposure device, a plurality of developing devices, a transfer belt, a transfer device, and the like. A latent image is formed on the photoconductive drum. The exposure device irradiates a photoreceptor with exposure light in accordance with image data in each color. The developing device develops a latent image held by the photoconductive drum with toner having a specific color. The developed toner image is transferred onto the transfer belt. The transfer belt is an intermediate transfer member. The transfer device transfers a toner image on the transfer belt to the paper.

The paper supplying device 12 supplies paper to be used for image forming to the image forming unit main body 11. For example, the paper supplying device 12 includes a cassette, a pick-up roller, a separating mechanism, a plurality of transporting rollers, a plurality of aligning rollers, and the like.

The cassette accommodates paper. The pick-up roller takes out the paper from the cassette. When a plurality of the paper are accommodated in the cassette, the separating mechanism separates an individual sheet to be fed, one by one, from the plurality of paper accommodated in the cassette by the pick-up roller. The plurality of transporting rollers transfers the paper, which are separated into individual sheet by the paper supplying device to the aligning roller. The aligning roller feeds the paper transferred by the transporting roller to a transferring position where the transfer belt and the transfer device are in contact with each other.

The image reading device 13 includes an original document placing table 21, an original document reading unit 22, a rotating unit 23, and an original document platen cover 24.

The original document placing table 21 is fixed to an upper part of the housing 10 so as to be able to open and close. The original document placing table 21 supports an original document being read by the original document reading unit 22. The original document placing table 21 includes an original document placing surface 21a, which is made of transparent glass, on a region where the original document to be read is placed.

The original document reading unit 22 includes an original document reading unit which reads the placed original document. For example, the original document reading unit 22 includes a lamp for lighting an original document and a reduction optical system. The lamp for lighting an original document and the reduction optical system are accommodated under the original document placing surface 21a.

The lamp for lighting an original document irradiates the original document placed on the original document placing surface 21a with light. The reduction optical system includes a CCD sensor including a light receiving surface. The reduction optical system receives reflection light reflected on the original document using a light receiving surface of the CCD sensor. That is, the original document reading unit irradiates the original document with light, and images reflected light on the light receiving surface of the CCD sensor as an image of an original document.

The rotating unit 23 is provided on an upper surface of the housing 10, and also on a rear surface side. The rotating unit 23 includes a rotation shaft, and rotatably supports the original document platen cover 24. The rotating unit 23 includes a movable region where the rotating unit is rotatable from a position in which the original document platen cover 24 is parallel to the original document placing surface 21a to a position at a degree orthogonal to the original document placing surface 21a.

The original document platen cover 24 covers at least the original document placing surface 21a. The original document platen cover 24 has a rectangular plate shape. The original document platen cover 24 includes a holding unit 24a configured to hold a portable terminal so that a camera 100 on a rear surface thereof faces the original document placing surface 21a.

For example, the portable terminal with camera 100 is a smart phone or the like having a camera function. The portable terminal with camera 100 includes a lens unit 100a for imaging. In addition, the portable terminal with camera 100 includes a display and an inputting device such as a touch panel.

The holding unit 24a holds the portable terminal with camera 100 in a position so that the lens unit 100a of the portable terminal with camera 100 is on the original document placing surface 21a side. The holding unit 24a is, for example, a rack configured to hold an outer frame part of the portable terminal with camera 100. The holding unit 24a is positioned on a lower surface of the original document platen cover 24, which faces the original document placing surface 21a, and the center along an axial direction of the rotation shaft of the rotating unit 23, and is provided on a side opposite to the rotating unit 23 in a direction orthogonal to the axial direction.

The control operating device 14 includes a display unit 31, an operating unit 32, a communication unit 33, a storing unit 34, and a controller 35. The display unit 31 is a display that displays information. The operating unit 32 is a touch panel integrally disposed on the display unit 31, an operation button, or the like, and is an inputting device for inputting an external command. For example, the display unit is provided on a front side of the housing 10. The communication unit 33 is a wireless communication adapter for wirelessly communicating with the portable terminal with camera 100.

The storing unit 34 is, for example, a flash memory, Hard Disk Drive (HDD), or Solid State Drive (SSD). The storing unit 34 stores a trapezoid distortion correction ratio for performing trapezoidal distortion correction which is calculated based on an angle with respect to the original document placing surface 21a of the original document platen cover 24. The trapezoidal distortion correction is performed to correct a trapezoidal distortion which results when an image of an object is captured from an oblique direction.

A transformation ratio is obtained based on a distance between the holding unit 24a and the original document placing surface 21a, and an angle with respect to the original document placing surface 21a of the original document platen cover 24. Based on the obtained transformation ratio, a trapezoid distortion correction ratio for correcting a captured image which is trapezoidally distorted is obtained.

The controller 35 includes a processor and a memory. The processor performs the operation of all of the functional units in the image forming apparatus 1 by executing programs or the like stored in the memory or the storing unit 34. The processor is, for example, a central processing unit (CPU). Alternatively, the function of the controller 35 can be realized by a control circuit, an ASIC, a programmed processor, and a combination thereof. The memory is, for example, volatile memory, non-volatile memory, or a combination thereof.

The controller 35 controls the communication unit 33 so that an image received through the communication unit 33 can be displayed on the display unit 31. The communication unit 33 receives the imaged captured by the portable terminal with camera 100, and the controller 35 displays the image on the display unit 31. The controller 35 performs trapezoidal distortion correction processing on the captured image as needed.

For example, the controller 35 corrects the captured image using the trapezoid distortion correction ratio stored in the storing unit 34 based on the angle with respect to the original document placing surface 21a of the original document platen cover 24. For example, the angle with respect to the original document placing surface 21a of the original document platen cover 24 is input by a user using the operating unit 32.

According to the image forming apparatus 1 including the image reading device 13 with such a configuration, the portable terminal with camera 100 is disposed on the original document platen cover 24 so that the lens unit 100a faces the original document placing surface 21a. Accordingly, when the portable terminal with camera 100 provided on the original document platen cover 24 is operated, the original document placed on the original document placing surface 21a can be imaged by the portable terminal with camera 100, which is held by the original document platen cover 24. Therefore, it is possible to prevent hand shaking or the like from being generated in the captured image. As a result, since the portable terminal with camera 100 which is distant from an object to be imaged is capable of imaging, the image reading device 13 is capable of imaging the object.

In addition, when the image forming apparatus 1 corrects the captured image using the controller 35 based on the angle with respect to the original document placing surface 21a of the original document platen cover 24, even when an object to be imaged which is placed on the original document placing surface 21a, is imaged from an oblique direction, it is possible to obtain an image having a rectangular shape. In addition, when a ratchet mechanism is included in the rotating unit 23, a trapezoid correction ratio based on an amount of rotation determined by the ratchet mechanism may be stored in the storing unit 34, and the captured image may be corrected based on the amount of rotation of the ratchet mechanism.

Also, in the embodiment, the control operating device 14 which is included in the image forming apparatus 1 is described, but the control operating device 14 may be included in the image reading device 13. In addition, the trapezoidal distortion correction may be performed not only by the controller 35, but may be performed by the portable terminal with camera 100 when a chart where a rectangular shape on which the trapezoidal distortion correction is performed is recorded in the portable terminal with camera 100 and read by the portable terminal with camera 100, and the portable terminal with camera 100 may correct a captured image so as to reproduce the captured image as a rectangular shape recorded in the chart.

As described above, according to the image forming apparatus 1 including the image reading device 13 of the embodiment, the portable terminal with camera 100 is capable of imaging an object to be imaged in a state in which the object to be imaged is held at a certain distance due to the original document platen cover 24. The image reading device 13 and the image forming apparatus 1 are capable of preventing effects of hand shaking from being generated in the image captured by the portable terminal with camera 100, and of imaging the entire range of the object.

Second Embodiment

Figure 2:
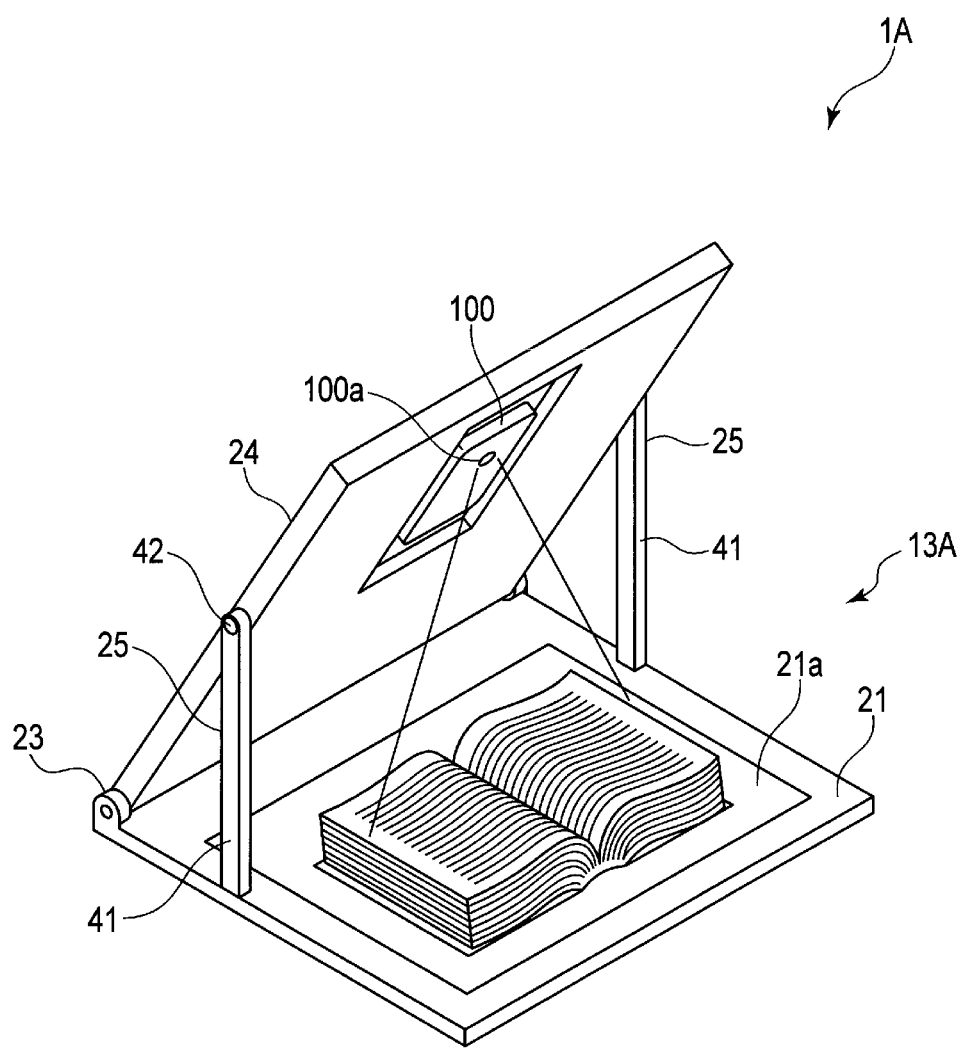
FIG. 2 is a perspective view illustrating a configuration of an image reading device of an image forming apparatus according to a second embodiment.
Figure 3:
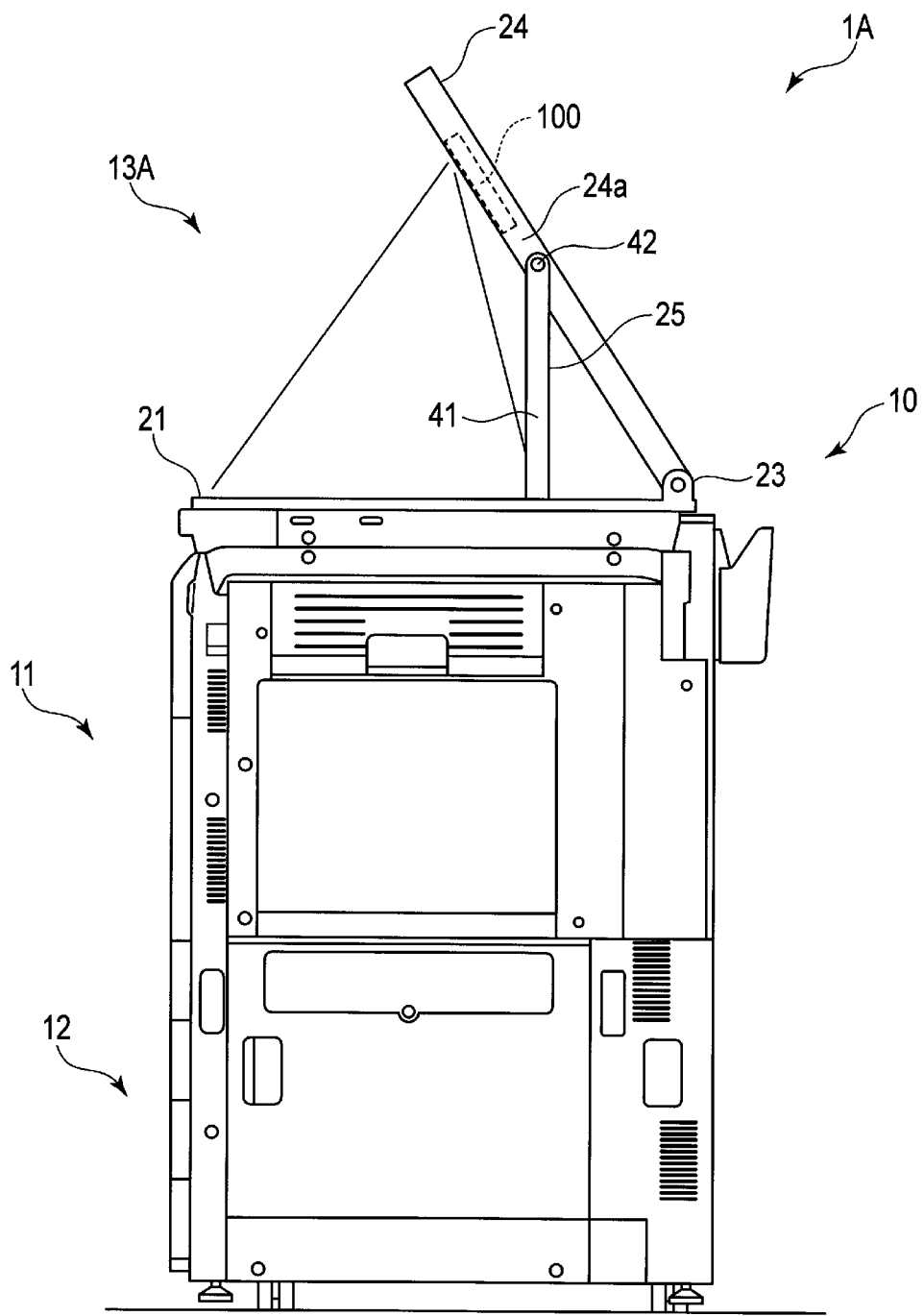
FIG. 3 is a side view illustrating an example of using the image forming apparatus according to embodiments.
Figure 4:
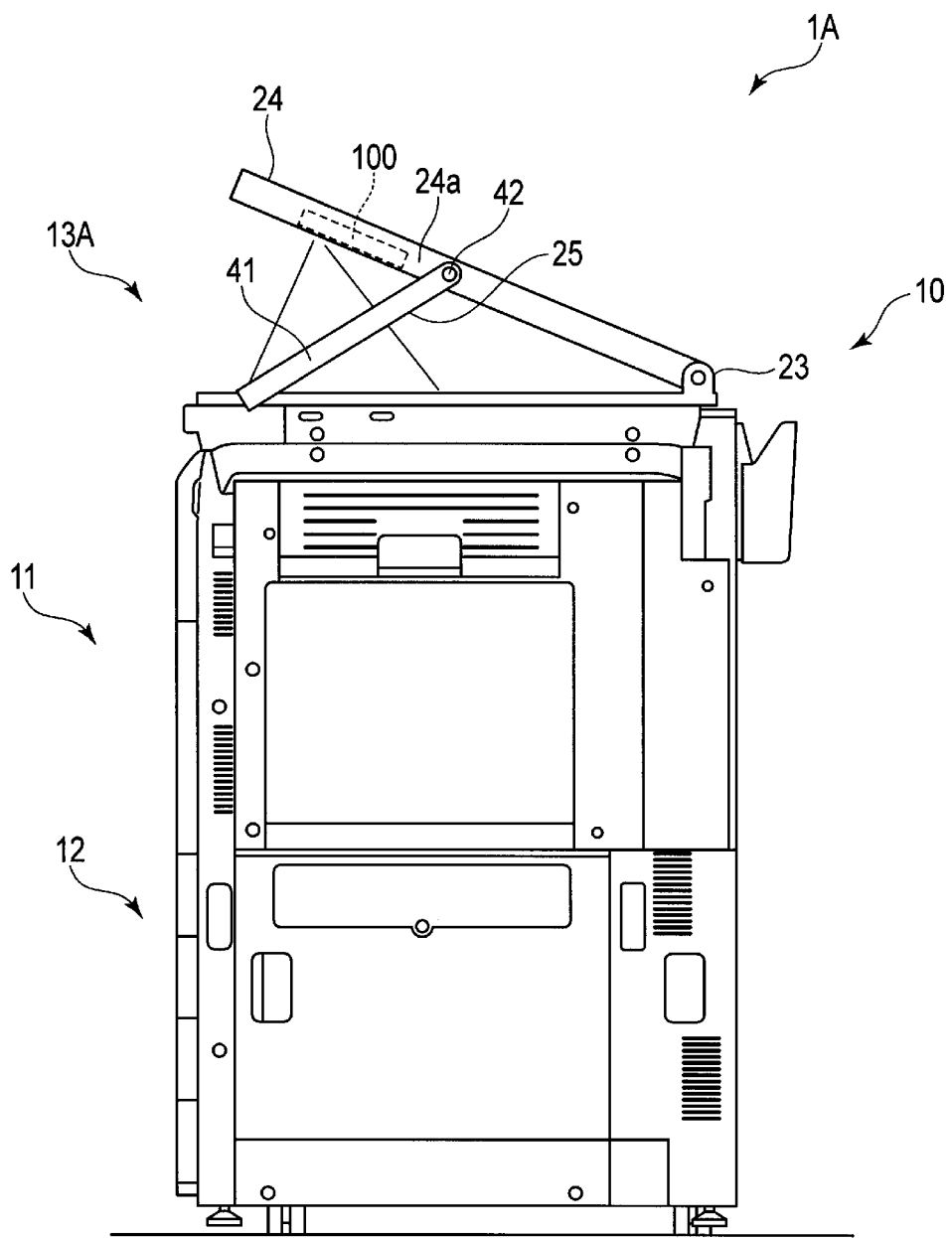
FIG. 4 is a side view illustrating the example of using the image forming apparatus according to embodiments.

Next, an image forming apparatus 1A according to a second embodiment will be described with reference to FIGS. 2 to 4. FIG. 2 is a perspective view illustrating a configuration of an image reading device 13A of the image forming apparatus 1A according to the second embodiment, and FIGS. 3 and 4 are side views illustrating an example of use in the configuration of the image forming apparatus 1A. Also, in the configuration of the image forming apparatus 1A according to the second embodiment illustrated in FIG. 2, the same numeral is given to an element same as the element of the image forming apparatus 1 according to the first embodiment described above, and detailed description thereof will be omitted. In addition, in FIG. 2, in the configuration of the image forming apparatus 1A, description of the housing 10, the image forming unit main body 11, and the paper supplying device 12 will be omitted.

As illustrated in FIGS. 2 to 4, the image forming apparatus 1A is provided with the housing 10, and includes the image forming unit main body 11, the paper supplying device 12, and the image reading device 13A which reads image information.

The image reading device 13A includes the original document placing table 21, the original document reading unit 22, the rotating unit 23, the original document platen cover 24, and a supporting rod 25.

The supporting rods 25 are rotatably mounted on both end surfaces in an axial direction of the rotating unit 23 of the original document platen cover 24 respectively. A pair of the supporting rods 25 is mounted in the original document platen cover 24.

The supporting rod 25 includes a post portion 41 and an attaching portion 42 which rotatably attaches the post portion 41 to a side surface of the original document platen cover 24. For example, one end of the post portion 41 is rotatably attached to a center part, in a direction orthogonal to the axial direction of the rotating unit 23, of a side surface of the original document platen cover 24 by the attaching portion 42. The post portion 41 can be rotated in a rotational direction around a rotational axis parallel with the axial direction of the rotating unit 23. The other end of the post portion 41 (hereinafter, referred to as "tip end") is configured to contact with an upper surface of the original document placing table 21, in a position in which the original document platen cover 24 is separated from the original document placing surface 21a.

When the original document platen cover 24 is positioned at a predetermined angle with respect to the original document placing surface 21a because a tip end is in contact with the original document placing table 21, the post portion 41 regulates rotation of the original document platen cover 24 toward the original document placing surface 21a, and rotation of the original document platen cover 24 due to its own weight.

The attaching portion 42 allows the post portion 41 to rotate, and supports the post portion 41 at a predetermined angle position with respect to the original document platen cover 24 by frictional force. It is desirable that the attaching portion 42 has a friction torque sufficiently greater than a rotational moment of the post portion 41 to fix the cover 24 at a fixed angle against gravity force. However, the friction torque at the attaching portion 42 should be within the range that a user can manually rotate the post portion 41 to fix the post portion 41 (supporting rod 25, platen cover 24) at a desirable angle. The attaching portion 42 includes, e.g., a rotational sliding bearing that provides the necessary friction torque to fix the cover 24 at a fixed angle against gravity force.

In addition, the attaching portion 42 is rotated by a predetermined angle, and may include any rotatable attaching mechanism as long as the attaching portion can be fixed. For example, the attaching portion 42 may include the ratchet mechanism. The supporting rod 25 including the ratchet mechanism is rotatable in only one direction by the ratchet mechanism through the attaching portion 42. The attaching portion 42 has a predetermined torque against rotation to fix the post portion 41 (supporting rod 25, platen cover 24) at a desirable angle.

According to the image forming apparatus 1A including the image reading device 13A with such a configuration, the apparatus 1A has the same effect as that of the image forming apparatus 1 described above. In addition, the image forming apparatus 1A adjusts an angle of the original document platen cover 24 by the supporting rod 25, and regulates rotation in a direction of the original document placing surface 21a of the original document platen cover 24. Accordingly, a distance between the portable terminal with camera 100 and the object can be adjusted, and the adjusted distance of the object can be prevented from being changed while performing the imaging by the camera 100. Therefore, a user can easily change a region to be imaged of the original document placed on the original document placing surface 21a in an arbitrary stepwise manner, and can stably image the region.

That is, as so-called half opening, when the original document platen cover 24 is largely separated from the original document placing surface 21a as illustrated in FIG. 3, a distance between the portable terminal with camera 100 and the object to be imaged becomes longer, and a region to be imaged becomes wider. With respect to that, as illustrated in FIG. 4, when the original document platen cover 24 is close to the original document placing surface 21a when compared to that of illustrated in FIG. 3, the distance between the portable terminal with camera 100 and the object to be imaged becomes shorter, and the region to be imaged becomes narrower. In addition, when the original document platen cover 24 is not fixed at a predetermined angle, the supporting rod 25 is not interfered by the original document placing surface 21a if the post portion 41 is angled so as to be along a side surface of the original document platen cover 24.

In addition, such an image forming apparatus 1A is capable of adjusting an angle of the original document platen cover 24 while displaying the captured image on the display unit 31.

Third Embodiment

Figure 5:
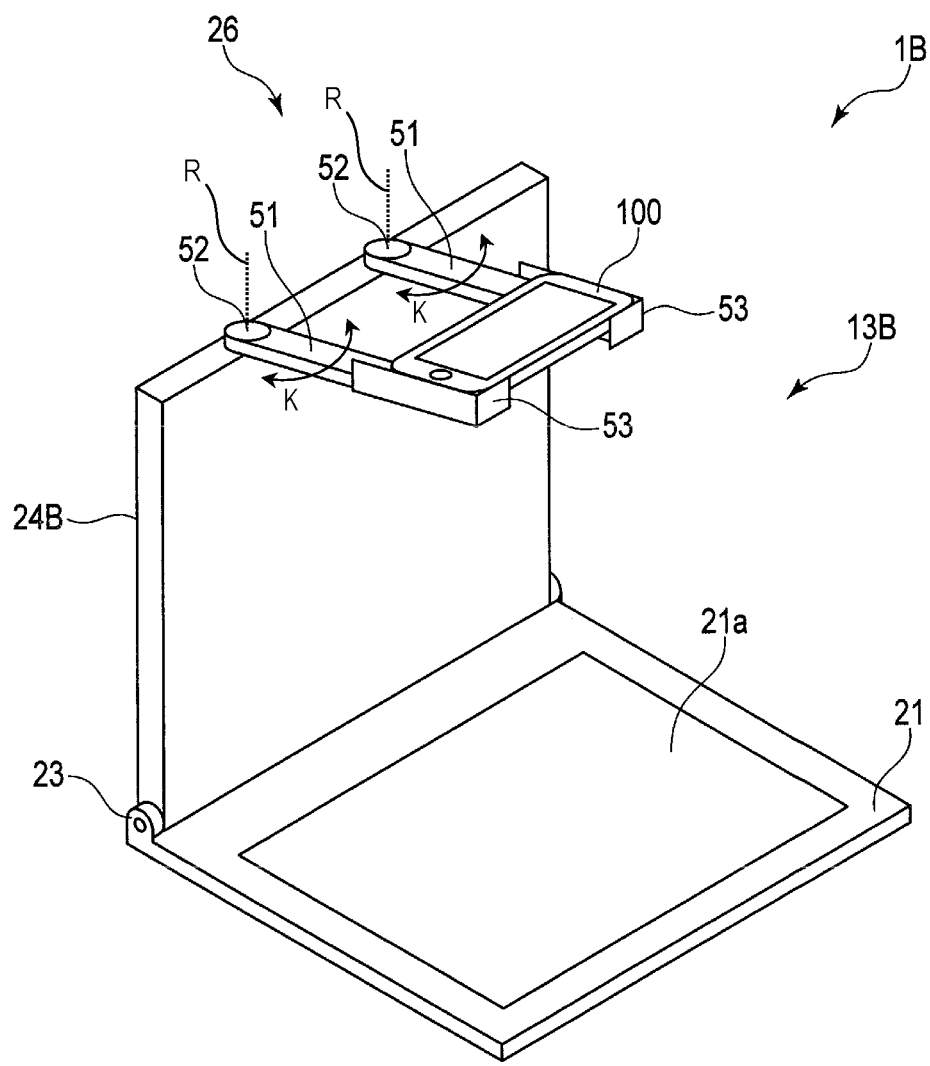
FIG. 5 is a perspective view illustrating an image reading device of an image forming apparatus according to a third embodiment.

Next, an image forming apparatus 1B according to a third embodiment will be described with reference to FIG. 5. FIG. 5 is a perspective view illustrating an image reading device 13B of the image forming apparatus 1B according to the third embodiment. Also, in a configuration of the image forming apparatus 1B according to the third embodiment illustrated in FIG. 5, the same numeral is given to an element same as that of the image forming apparatus 1 according to the first embodiment as described above, and detailed description thereof will be omitted. In addition, in FIG. 5, in the configuration of the image forming apparatus 1B, descriptions of the housing 10, the image forming unit main body 11, and the paper supplying device 12 will be omitted.

The image forming apparatus 1B is provided with the housing 10, and includes the image forming unit main body 11, the paper supplying device 12, and the image reading device 13B which reads image information.

The image reading device 13B includes the original document placing table 21, the original document reading unit 22, the rotating unit 23, and an original document platen cover 24B.

The original document platen cover 24B covers at least the original document placing surface 21a. The original document platen cover 24B has a rectangular plate shape. The original document platen cover 24B includes a holder 26 on an edge opposite to the rotating unit 23 in a direction orthogonal to an axial direction of the rotating unit 23. The holder 26 is configured to hold the portable terminal with camera 100. In addition, the original document platen cover 24B does not include the holding unit 24a described in the first embodiment.

The holder 26 is provided with a pair of arms 51, a pair of attaching portions 52 provided on one end portions of the arms 51, and a pair of guides 53 provided on the other end portions of the arms 51. The arm 51 is formed in a bar shape. The pair of arms 51 is disposed on a side surface of the original document platen cover 24B with a predetermined interval. Here, the predetermined interval is an interval that the portable terminal with camera 100 can be held by the guide 53 when the arm 51 is disposed so as to extend in a direction intersecting with or orthogonal to a longitudinal direction of a side surface of the original document platen cover 24.

The attaching portion 52 allows the arm 51 to rotate in a rotational direction K around a rotational axis R, that is orthogonal to the rotational axis of the original document platen cover 24B, of the attaching portion 52, and supports the arm 51 at a predetermined position by frictional force. It is desirable that the attaching portion 52 be designed with a friction torque that is sufficiently greater than a rotational moment applied to the stay 51 at the time of holding the portable terminal with camera 100, and allows a user to manually rotate it to a desired angle. A pair of the guides 53 holds the portable terminal with camera 100 when the guides are facing each other.

According to the image forming apparatus 1B including the image reading device 13B with such a configuration, the apparatus 1B has the same effect as that of the image forming apparatus 1 according to the first embodiment. In addition, the image reading device 13B is capable of making an imaging distance and angle between an object to be imaged and the portable terminal with camera 100 at the time of imaging be constant, in addition to an effect of stable imaging using the portable terminal with camera 100. In addition, when the original document platen cover 24B stands upright, the object to be imaged can be imaged by the portable terminal with camera 100 in a direct upward direction of the object to be imaged. Therefore, the captured image becomes a rectangular shape, and can be prevented from being distorted into a trapezoidal shape. That is, the image reading device 13B does not need to correct a trapezoidal distortion of the captured image. Also, the captured image may be corrected so as to be closer to a rectangular shape.

Fourth Embodiment

Figure 6:
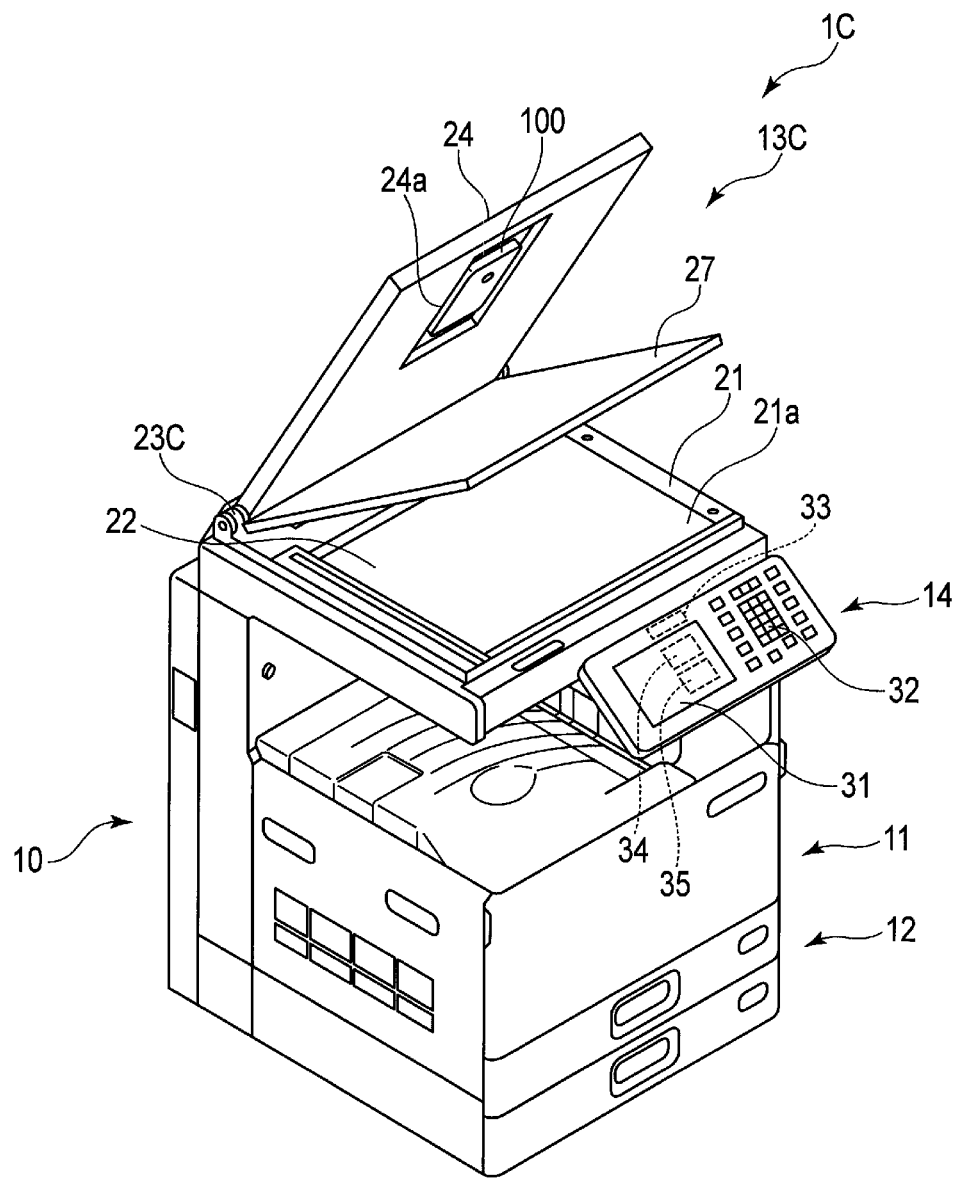
FIG. 6 is a perspective view illustrating an example of using an image forming apparatus according to a fourth embodiment.
Figure 7:
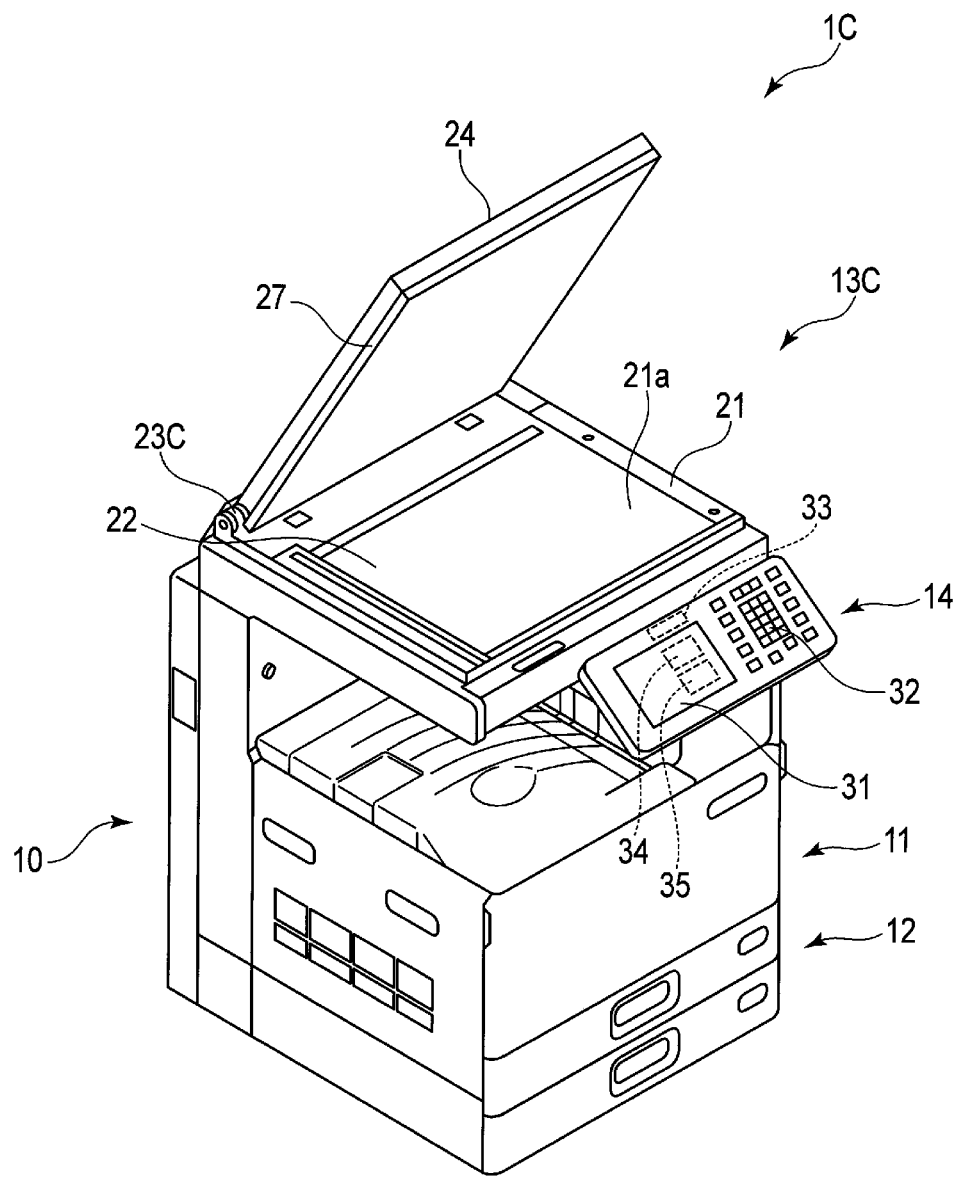
FIG. 7 is a perspective view illustrating an example of using the image forming apparatus according to the fourth embodiment.
Figure 8:
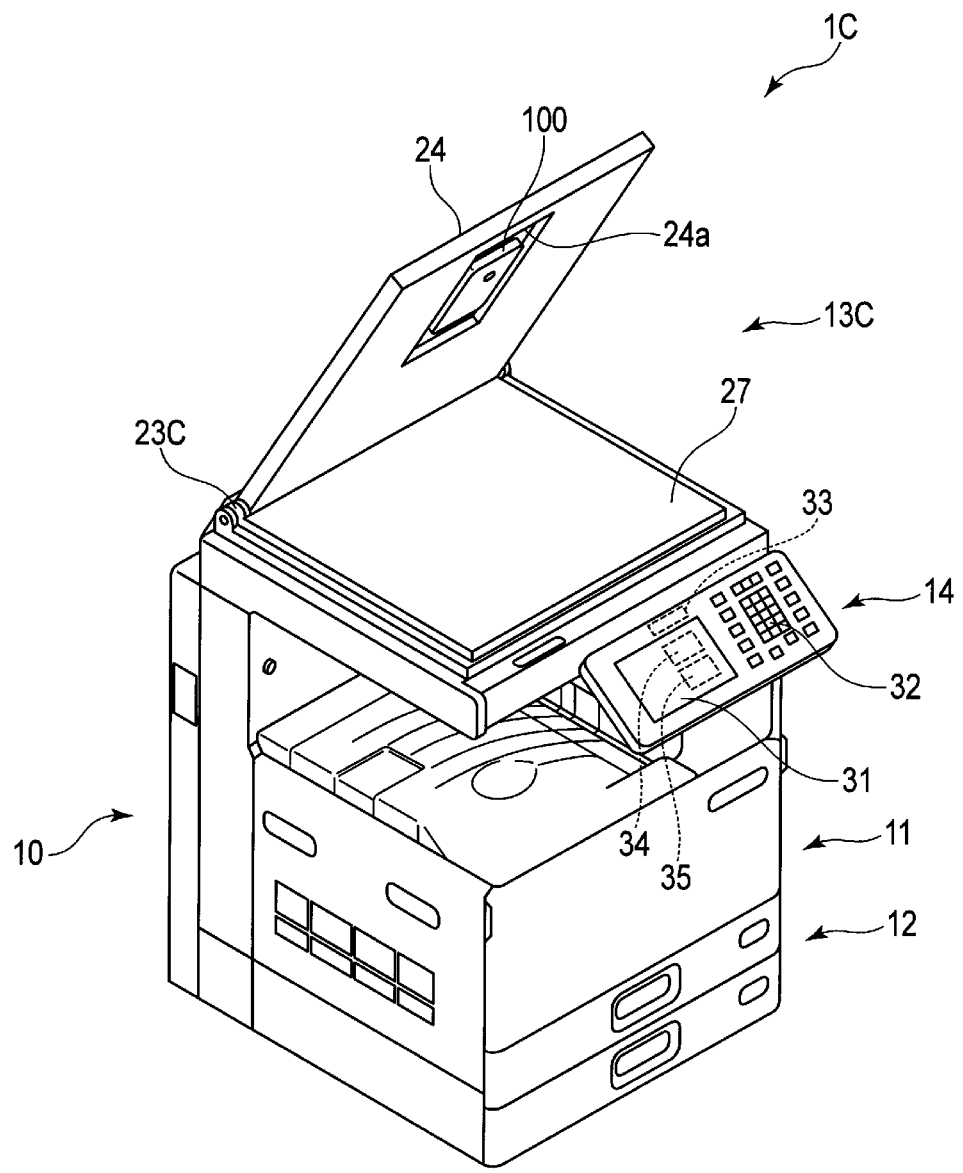
FIG. 8 is a perspective view illustrating the example of using the image forming apparatus according to the fourth embodiment.

Next, an image forming apparatus 1C according to a fourth embodiment will be described with reference to FIGS. 6 to 8. FIGS. 6 to 8 are perspective views illustrating an example of use in a configuration of the image forming apparatus 1C according to the fourth embodiment. Also, in the configuration of the image forming apparatus 1C according to the fourth embodiment as illustrated in FIGS. 6 to 8, the same numeral is given to an element same as the element of the image forming apparatus 1 according to the first embodiment described above, detailed description thereof will be omitted.

As illustrated in FIGS. 6 to 8, the image forming apparatus 1C is provided with the housing 10, and includes the image forming unit main body 11, the paper supplying device 12, an image reading device 13C which reads image information, and the control operating device 14.

The image reading device 13C includes the original document placing table 21, the original document reading unit 22, the rotating unit 23C, the original document platen cover 24, and a work plate 27. The rotating unit 23C is provided on an upper surface of the housing 10. The rotating unit 23C includes a rotation shaft that extends in a direction parallel with the original document placing surface 21a, and respectively rotatably supports the original document platen cover 24 and the work plate 27. The rotating unit 23C includes a movable region where the rotating unit is rotatable from a position in which the original document platen cover 24 and the work plate 27 are in parallel to the original document placing surface 21a to a position at a degree orthogonal to the original document placing surface 21a.

The work plate 27 is disposed between the original document placing table 21 and the original document platen cover 24. When the work plate 27 is at an angular position parallel with the original document placing surface 21a, the work plate 27 covers at least the original document placing surface 21a. The work plate 27 has a rectangular plate shape, and at least a surface facing the original document platen cover 24 is configured to be flat so that an object being imaged by the portable terminal with camera 100 can be placed.

The work plate 27 includes a white resin sheet on a surface facing the original document placing surface 21a. This is because an original document background part, which is a configuration other than an object to be imaged, such as the portable terminal with camera 100 and the holding unit 24a, does not appear on the read image, when the original document reading unit 22 reads the object to be imaged. The work plate 27 can be configured, for example, such that a surface facing the original document platen cover 24 with a background color which is desirable to be imaged, or can be made of a material which is capable of preventing reflection of light.

Usage of the image reading device 13C with such a configuration will be described. In a case where the original document placed on the original document placing surface 21a is read by the original document reading unit 22, as illustrated in FIG. 7, the original document platen cover 24 and the work plate 27 are operated at the same time, an original document placed on the original document placing surface 21a is covered and read. In addition, when an object to be imaged is imaged, as illustrated in FIG. 8, the original document placing surface 21a is covered with the work plate 27, and the object to be imaged is placed on the work plate 27 and is imaged by the portable terminal with camera 100.

According to the image forming apparatus 1C including the image reading device 13C with such a configuration, the apparatus 1C has the same effect as that of the image forming apparatus 1 of the first embodiment. In addition, since the image reading device 13C includes the work plate 27, when the original document is read by the original document reading unit 22, it is possible to prevent the holding unit 24a and the like provided on the original document platen cover 24 from being imaged in an image generated by reading the original document.

In addition, the work plate 27 is capable of preventing the object to be imaged from being directly placed on the original document placing surface 21a. That is, the work plate 27 is capable of preventing the original document reading unit 22 from being reflected on the imaged image through the original document placing surface 21a, which is a transparent glass, and preventing dirt or damage from being generated on the original document placing surface 21a due to the object.

In addition, the work plate 27 is capable of configuring an appropriate background according to a purpose of imaging at the time of imaging. For example, the work plate 27 is capable of appropriately imaging by changing a color of a surface facing the portable terminal with camera 100 at the time of imaging, or using a surface on which light can be prevented from being reflected. In addition, since an upper surface of the work plate 27 can be used for working, and for example, writing on paper or a notebook, cutting of printing paper, or the like can be performed on the work plate 27.

Fifth Embodiment

Next, an image forming apparatus 1D according to a fifth embodiment will be described with reference to FIGS. 9 to 13.

Figure 9:
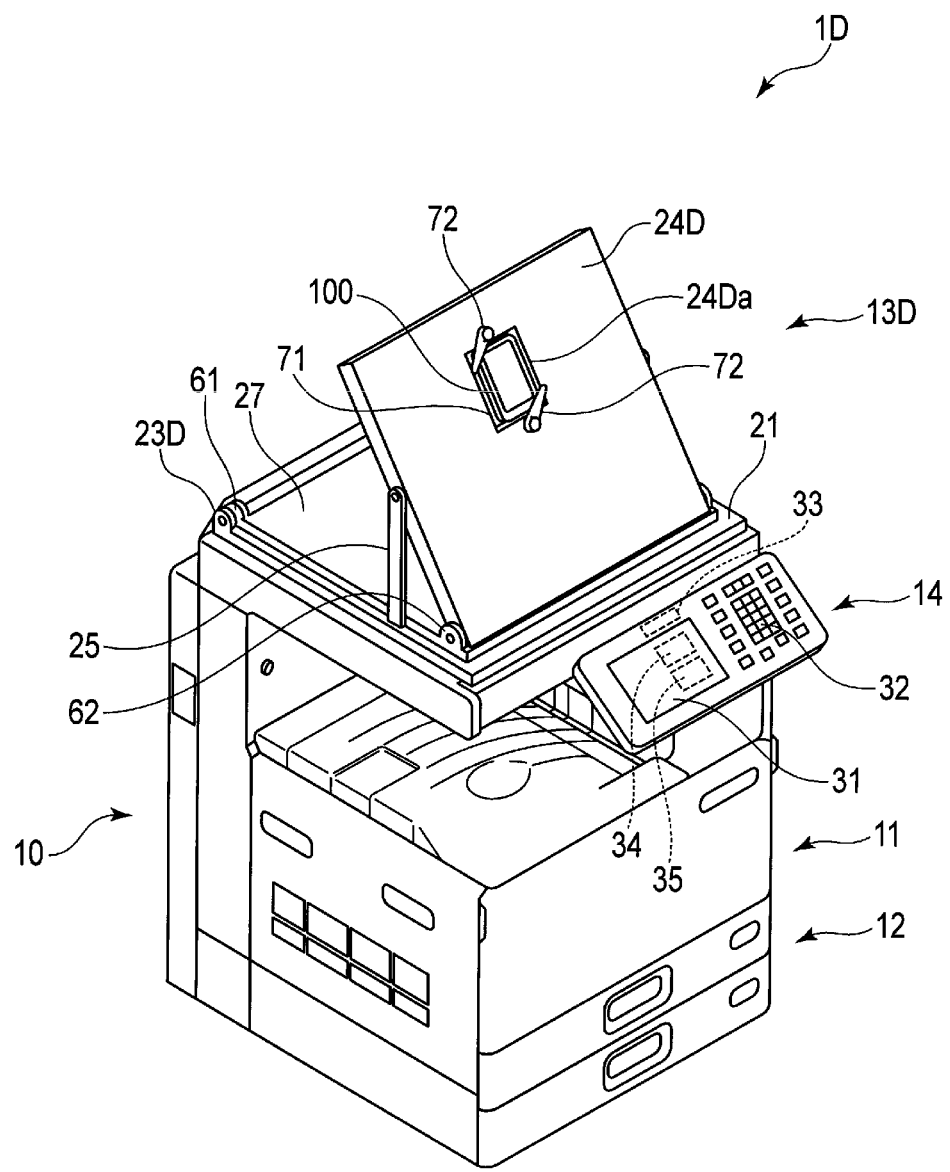
FIG. 9 is a perspective view illustrating a configuration of an image forming apparatus according to a fifth embodiment.
Figure 10:
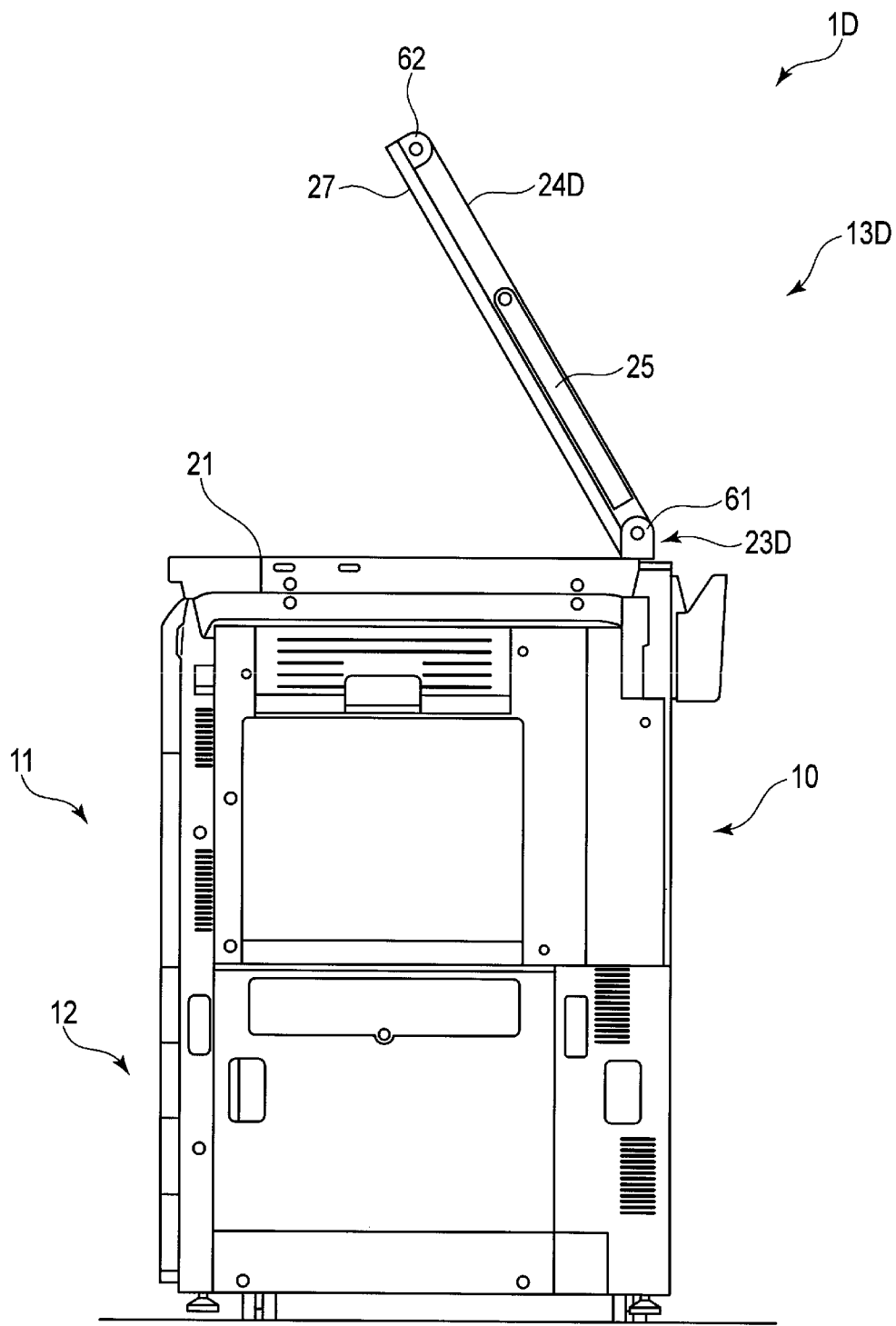
FIG. 10 is a side view illustrating an example of using the image forming apparatus according to the fifth embodiment.
Figure 11:
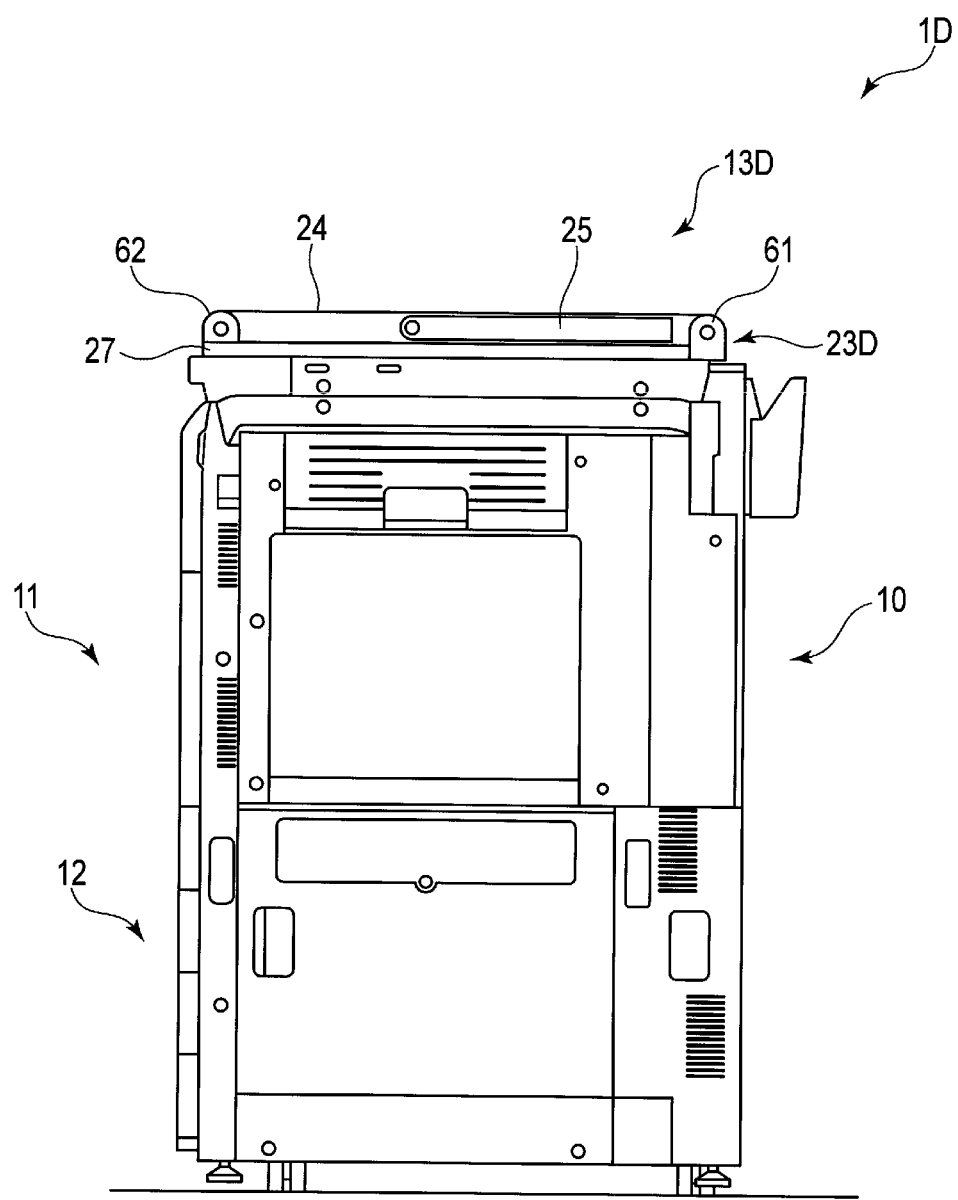
FIG. 11 is a side view illustrating the example of using the image forming apparatus according to the fifth embodiment.
Figure 12:
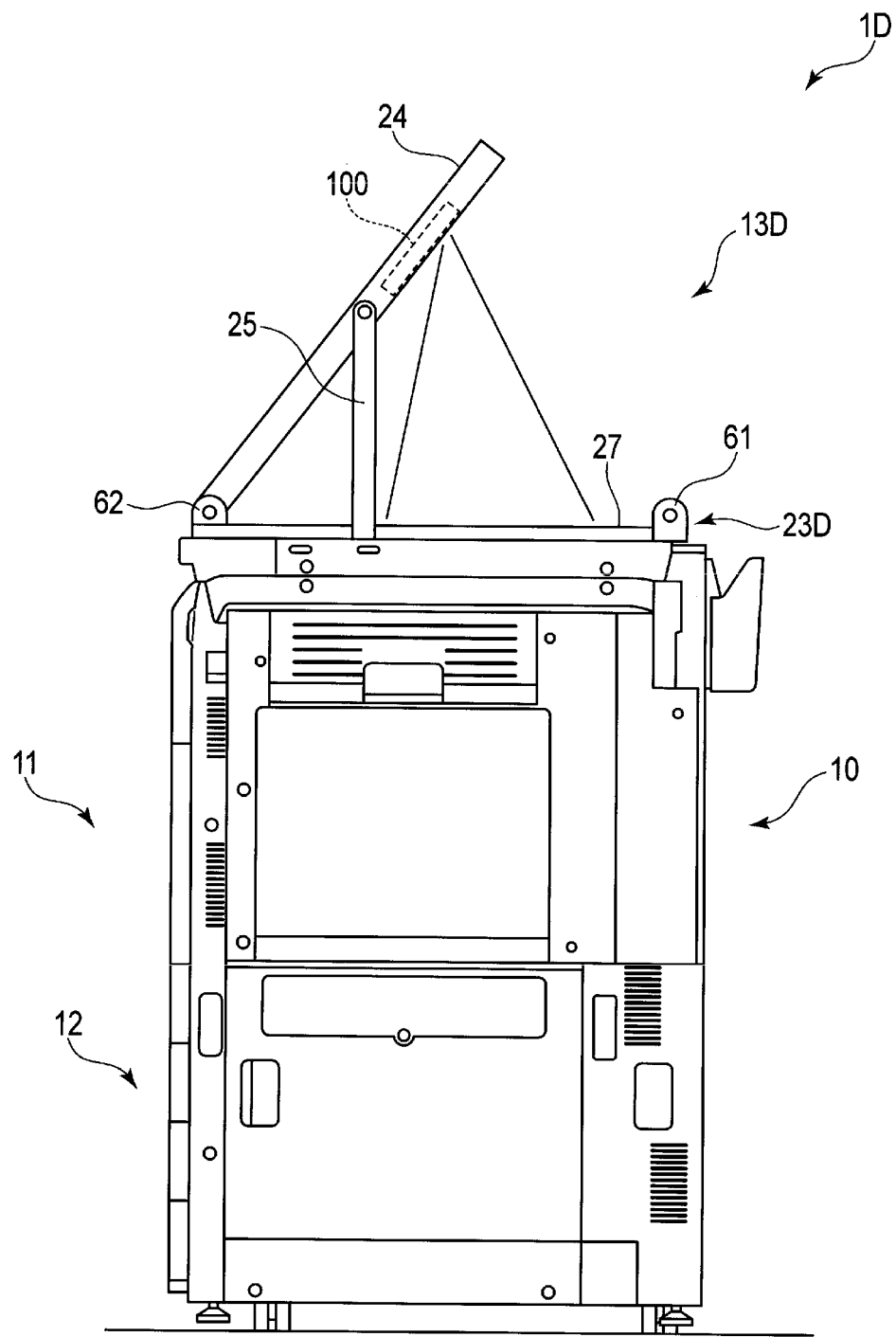
FIG. 12 is a side view illustrating the example of using the image forming apparatus according to the fifth embodiment.
Figure 13:
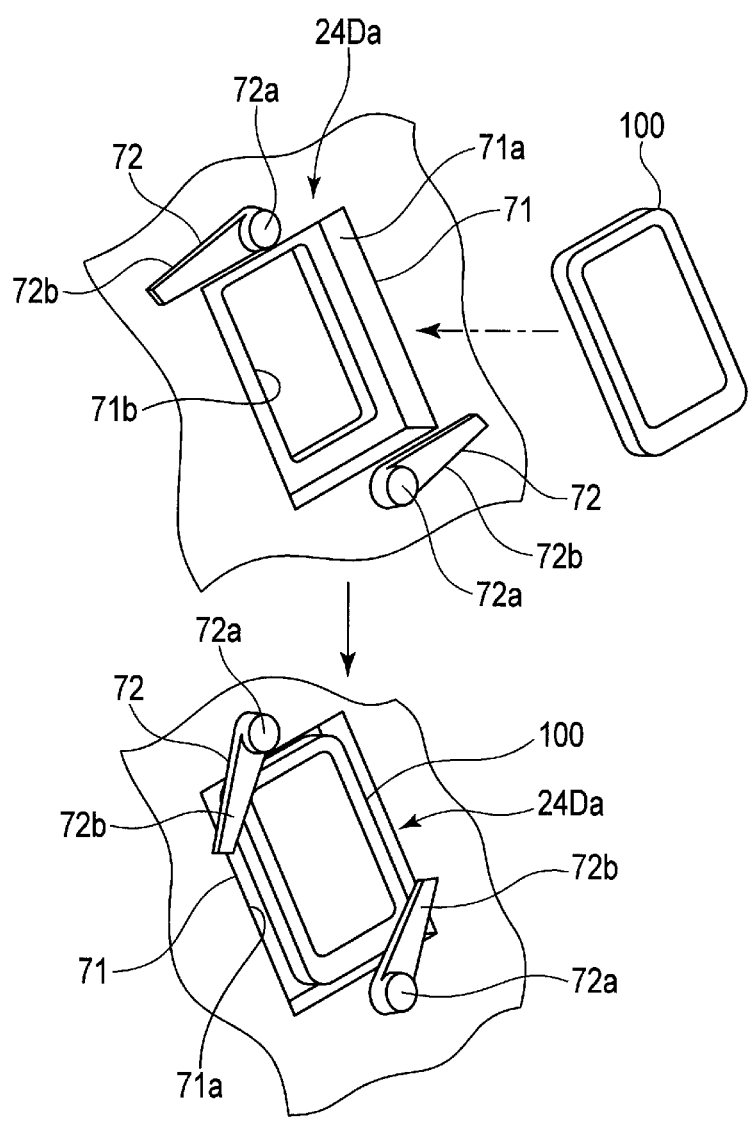
FIG. 13 is an explanatory view illustrating a configuration of a holding unit and the example of using the image forming apparatus according to the fifth embodiment.

FIG. 9 is a perspective view illustrating a configuration of the image forming apparatus 1D according to the fifth embodiment. FIGS. 10 to 12 are side views illustrating an example of use of the image forming apparatus 1D. FIG. 13 is an explanatory view illustrating a configuration and an example of use of the holding unit 24Da of the image forming apparatus 1D. Also, in the configuration of the image forming apparatus 1D according to the fifth embodiment illustrated in FIGS. 9 to 13, the same numerals are given to elements same as those of the image forming apparatuses 1, 1A, 1B, and 1C according to the first embodiment to the fourth embodiment described above, and detailed description thereof will be omitted.

As illustrated in FIGS. 9 to 12, the image forming apparatus 1D is provided with the housing 10, and includes the image forming unit main body 11, the paper supplying device 12, the image reading device 13D which reads the image information, and the control operating device 14.

The image reading device 13D includes the original document placing table 21, the original document reading unit 22, a rotating unit 23D, an original document platen cover 24D, the supporting rod 25, and the work plate 27.

The rotating unit 23D is provided on an upper surface of the original document placing table 21. The rotating unit 23D is provided with a first rotating unit 61 provided on a rear surface side of an upper surface of the housing 10 and a second rotating unit 62 provided on a front surface side of an upper surface of the housing 10. The first rotating unit 61 includes a rotation shaft, and rotatably supports the work plate 27. The first rotating unit 61 is provided on a rear surface side of an upper surface of the housing 10. The first rotating unit 61 includes a movable region where the rotating unit is rotatable from a position in which the work plate 27 is in parallel to the original document placing surface 21a to a position at a degree orthogonal to the original document placing surface 21a.

The second rotating unit 62 is provided on the work plate 27. The second rotating unit 62 includes a rotation shaft, and rotatably supports the original document platen cover 24D. The second rotating unit 62 is provided on a front surface side of the housing 10. The second rotating unit 62 includes a movable region where the rotating unit is rotatable from a position in which the original document platen cover 24D is in parallel to the work plate 27 placed on the original document placing surface 21a, to a position at a degree orthogonal to the original document placing surface 21a.

The original document platen cover 24D includes the holding unit 24Da which faces the work plate 27 and holds the portable terminal with camera 100.

The holding unit 24Da is at the center in an axial direction of a rotation shaft of the second rotating unit 62 in the original document platen cover 24D, and is provided on a side opposite to the second rotating unit 62 in a direction orthogonal to the axial direction. The holding unit 24Da is a rack holding the portable terminal with camera 100. Specifically, as illustrated in FIGS. 9 and 13, the holding unit 24Da includes an opening portion 71 disposed on an outer surface of the original document platen cover 24D and a flipper 72 provided on the outer surface of the original document platen cover 24D.

The opening portion 71 is configured to have an opening shape in which an outer surface side of the original document platen cover 24D has a size greater than an outer shape of the portable terminal with camera 100 and the portable terminal with camera 100 can be inserted thereto, and also is configured to have an opening shape in which an inner surface side facing the work plate 27 of the original document platen cover 24D has a size smaller than an outer shape of the portable terminal with camera 100 and a lens unit 100a of the portable terminal with camera 100 can be disposed thereon. That is, the opening portion 71 includes a first opening portion 71a which is provided on an outer surface side of the original document platen cover 24D and has a size greater than an outer shape of the portable terminal with camera 100, and a second opening portion 71b which is provided on an inner surface side of the original document platen cover 24D, has a size smaller than an opening shape of the first opening portion 71a, and at least the lens unit 100a can be disposed thereon. The opening portion 71 holds the portable terminal with camera 100 and prevents that the portable terminal with camera 100 falls down to an inner surface side of the original document platen cover 24D through the second opening portion 71b, by a difference between opening areas of the first opening portion 71a and the second opening portion 71b.

The flipper 72 is provided with a knob portion 72a that a user operates by pinching, and an arm portion 72b which holds the portable terminal with camera 100 disposed in the opening portion 71. The knob portion 72a is, for example, rotatably provided on an outer surface of the original document platen cover 24D. For example, a pair of the holding stays 72 is provided.

The arm portion 72b is integrally fixed to the knob portion 72a. The arm portion 72b is configured to have a thin plate shape. The arm portion 72b covers a part of an outer surface of the portable terminal with camera 100 disposed in the opening portion 71 according to rotation of the knob portion 72a. That is, the arm portion 72b holds the opening portion 71 and the portable terminal with camera 100 by being in contact with a part of the outer surface of the portable terminal with camera 100. That is, the arm portion 72b prevents the portable terminal with camera 100 disposed in the opening portion 71 from being moved in the opening portion 71, or falling down from the opening portion 71.

According to the image forming apparatus 1D including the image reading device 13D with such a configuration, the apparatus 1D has the same effect as that of the image forming apparatus 1 of the first embodiment and the image forming apparatus 1A of the second embodiment. In addition, as illustrated in FIGS. 9 and 12, in the image reading device 13D, the original document platen cover 24 is rotated toward a front side of the housing 10 by the second rotating unit 62. In addition, the original document platen cover 24D includes the holding unit 24Da which holds the portable terminal with camera 100 disposed from the outer surface side.

Therefore, when the object to be imaged is imaged by the portable terminal with camera, the portable terminal with camera 100 faces a user. The image reading device 13D visually recognizes displaying on the display and is capable of easily operating the portable terminal with camera 100, when the portable terminal with camera 100 including the display on a main surface of a side opposite to the lens unit 100a is used.

In addition, when the original document is placed on the original document placing surface 21a and the original document reading unit 22 reads the original document, as illustrated in FIGS. 10 and 11, the original document platen cover 24D and the work plate 27 may be rotated based on the first rotating unit 61, and the original document may be placed on the original document placing surface 21a.

According to the image reading device and the image forming apparatus of at least one of the embodiments described above, the portable terminal with camera is capable of imaging in a state of being held as a certain distance from the object to be imaged by a platen cover. The image reading device and the image forming apparatus are capable of preventing that hand shaking is generated in the image captured by the portable terminal with camera 100, and of imaging the entire range of the object.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading device comprising:
  a document placing table;
  a cover that is rotatably attached to the document placing table and includes a receptacle for a portable terminal with a camera, the receptacle being configured to hold the portable terminal so that the camera faces the document placing table;
  a communication unit configured to wirelessly communicate with the portable terminal;
  a display;
  a controller configured to cause an image captured by the camera and received through the communication unit, to be displayed on the display; and
  a storage device in which correction factors that are used in performing correction on the image captured by the camera, is stored,
  wherein the controller performs the correction using the correction factors and an angle of the cover with respect to the document placing table.

2. The device according to claim 1, further comprising:
  a supporting arm on a side surface of the cover, the supporting arm having a first end rotatably supported on the side surface and a second end in contact with the document placing table.

3. The device according to claim 1,
  wherein the receptacle is a rack provided on a lower surface of the cover that faces the document placing table.

4. The device according to claim 3, wherein the receptacle includes:
  a first opening that is on an upper surface of the cover, and has a size greater than an outer shape of the portable terminal, and
  a second opening that has on a lower surface of the cover and has a size smaller than the outer shape of the portable terminal, so that a lens unit of the camera is exposed through the second opening.

5. The device according to claim 1, further comprising:
a work plate that is provided between the document placing table and the cover, and is rotatable with respect to the document placing table.

6. The device according to claim 5, wherein an axis of rotation of the cover is coaxial with an axis of rotation of the work plate.

7. The device according to claim 5, wherein an axis of rotation of the cover and an axis of rotation of the work plate are located along opposite sides of the document placing table.

8. An image reading device comprising:
a document placing table;
a cover rotatably attached to the document placing table and includes first, second, third, and fourth sides, wherein the first side remains in place as the cover rotates and the second side opposite to the first side moves away from the document placing table, and the third and fourth sides are opposite sides that connect the first and second sides;
a holder for a portable terminal with a camera, the holder including first and second arms that are rotatably attached to the second side of the cover and first and second supports, respectively attached to the first and second arms, for supporting a bottom and sides of the portable terminal;
a communication unit configured to wirelessly communicate with the portable terminal;
a display;
a controller configured to cause an image captured by the camera and received through the communication unit, to be displayed on the display; and
a storage device in which correction factors that are used in performing correction on the image captured by the camera, is stored,
wherein the controller performs the correction using the correction factors and an angle of the cover with respect to the document placing table.

9. An image forming apparatus comprising:
a document placing table;
a cover rotatably attached to the document placing table, the cover including a holder for a portable terminal with a camera, the holder being configured to hold the portable terminal so that the camera faces the document placing table;
an image forming unit configured to form an image read by an image reading device on a recording medium;
a communication unit configured to wirelessly communicate with the portable terminal;
a display;
a controller configured to cause an image captured by the camera and received through the communication unit, to be displayed on the display; and
a storage device in which correction factors that are used in performing correction on the image captured by the camera, is stored,
wherein the controller performs the correction using the correction factors and an angle of the cover with respect to the document placing table.

10. The apparatus according to claim according to claim 9, further comprising:
a supporting arm on a side surface of the cover, the supporting arm having a first end rotatably supported on the side surface and a second end in contact with the document placing table.

11. The apparatus according to claim 9,
wherein the holder is a rack provided on a lower surface of the cover that faces the document placing table.

12. The apparatus according to claim 11, wherein the holder includes:
a first opening that is on an upper surface of the cover, and has a size greater than an outer shape of the portable terminal, and
a second opening that has on a lower surface of the cover and has a size smaller than the outer shape of the portable terminal, so that a lens unit of the camera is exposed through the second opening.

13. The apparatus according to claim 9, further comprising:
a work plate that is provided between the document placing table and the cover, and is rotatable with respect to the document placing table.

14. The apparatus according to claim 13, wherein an axis of rotation of the cover is coaxial with an axis of rotation of the work plate.

15. The apparatus according to claim 13, wherein an axis of rotation of the cover and an axis of rotation of the work plate are located along opposite sides of the document placing table.

16. The apparatus according to claim 9, wherein the holder includes first and second arms that are rotatably attached to a side of the cover and first and second supports, respectively attached to the first and second arms, for supporting a bottom and sides of the portable terminal.

* * * * *